(12) United States Patent
Endo

(10) Patent No.: US 9,432,569 B2
(45) Date of Patent: Aug. 30, 2016

(54) IMAGING DEVICE AND FOCUS CONTROL METHOD

(71) Applicant: FUJIFILM Corporation, Tokyo (JP)

(72) Inventor: Hiroshi Endo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/640,858

(22) Filed: Mar. 6, 2015

(65) Prior Publication Data

US 2015/0181108 A1    Jun. 25, 2015

Related U.S. Application Data

(63) Continuation of application No. PCT/JP2013/065022, filed on May 30, 2013.

(30) Foreign Application Priority Data

Sep. 6, 2012    (JP) .................................. 2012-196094

(51) Int. Cl.
*H04N 5/232* (2006.01)
*G02B 7/34* (2006.01)
(Continued)

(52) U.S. Cl.
CPC ............ *H04N 5/23212* (2013.01); *G02B 7/34* (2013.01); *G03B 13/36* (2013.01); *H04N 5/3696* (2013.01); *G03B 2206/00* (2013.01); *H04N 2101/00* (2013.01)

(58) Field of Classification Search
CPC ................ H04N 5/23212; G02B 7/34; H01L 27/14623
USPC .................................................. 348/302, 345
See application file for complete search history.

(56) References Cited

U.S. PATENT DOCUMENTS 8,704,940 B2 *   4/2014   Aoki .................... G02B 7/34
                                                     348/241
2008/0074534 A1 *  3/2008   Kusaka ............. H04N 5/23212
                                                     348/364

(Continued)

FOREIGN PATENT DOCUMENTS

JP          07-143391 A      6/1995
JP         2007-219539 A     8/2007

(Continued)

OTHER PUBLICATIONS

International Search Report issued in PCT/JP2013/065022 dated Sep. 3, 2013.

(Continued)

*Primary Examiner* — Usman Khan
(74) *Attorney, Agent, or Firm* — Birch, Stewart, Kolasch & Birch, LLP

(57) ABSTRACT

An imaging device, includes: a sensor including first phase difference detecting pixels arranged in a row direction and second phase difference detecting pixels arranged in the row direction; a defocus amount calculating unit which calculates a correlated amount of a first output signal group and a second output signal group while shifting the first output signal group and the second output signal group in the row direction by an arbitrary amount to calculate a defocus amount from a first shift amount of the first output signal group and the second output signal group when the correlated amount is at a maximum. The defocus amount calculating unit changes an upper limit of a shift amount of the first output signal group and the second output signal group in accordance with at least one of an F value, a focal distance, and a position of a focus lens.

9 Claims, 9 Drawing Sheets

(51) Int. Cl.
*G03B 13/36* (2006.01)
*H04N 5/369* (2011.01)
*H04N 101/00* (2006.01)

(56) References Cited

U.S. PATENT DOCUMENTS

| | | | |
|---|---|---|---|
| 2008/0118238 A1* | 5/2008 | Sogawa | G02B 7/285 396/128 |
| 2009/0092386 A1 | 4/2009 | Kishimoto et al. | |
| 2011/0096212 A1* | 4/2011 | Oikawa | G03B 13/36 348/273 |
| 2014/0139725 A1* | 5/2014 | Nagano | H04N 5/23212 348/354 |
| 2014/0267865 A1* | 9/2014 | Kishi | G03B 13/36 348/310 |

FOREIGN PATENT DOCUMENTS

| | | |
|---|---|---|
| JP | 2009-063952 A | 3/2009 |
| JP | 2009-092824 A | 4/2009 |
| JP | 2010-139624 A | 6/2010 |
| JP | 2012-141549 A | 7/2012 |

OTHER PUBLICATIONS

Written Opinion of the International Searching Authority issued in PCT/JP2013/065022 dated Sep. 3, 2013.

* cited by examiner

FIG. 4

|  | FOCAL DISTANCE (CONVERTING INTO 35 mm FILM) | | | | |
|---|---|---|---|---|---|
|  | LESS THAN 28 | 28 OR MORE LESS THAN 56 | 56 OR MORE LESS THAN 100 | 100 OR MORE LESS THAN 200 | 200 OR MORE |
| LESS THAN F1.4 | 16 | 32 | — | — | — |
| F1.4 OR MORE LESS THAN F2.0 | 12 | 24 | 48 | — | — |
| F2.0 OR MORE LESS THAN F2.8 | 8 | 16 | 32 | 64 | — |
| F2.8 OR MORE LESS THAN F4.0 | 6 | 12 | 24 | 48 | 96 |
| F4.0 OR MORE LESS THAN F5.6 | 4 | 8 | 16 | 32 | 64 |
| F5.6 OR MORE LESS THAN F8.0 | 3 | 6 | 12 | 24 | 48 |
| F8.0 OR MORE | 2 | 4 | 8 | 16 | 32 |

IMAGING DEVICE AND FOCUS CONTROL METHOD

CROSS REFERENCE TO RELATED APPLICATION

This is a continuation of International Application No. PCT/JP2013/065022 filed on May 30, 2013, and claims priority from Japanese Patent Application No. 2012-196094, filed on Sep. 6, 2012, the entire disclosures of which are incorporated herein by reference.

BACKGROUND

1. Technical Field

The present invention relates to an imaging device and a focus control method.

2. Related Art

Recently, as the resolution of a solid-state imaging element such as a charge coupled device (CCD) image sensor and a complementary metal oxide semiconductor (CMOS) image sensor becomes higher, a demand for an information device having a photographing function such as a digital still camera, a digital video camera, a cellular phone such as a smart phone, and a personal digital assistant (PDA) is rapidly increasing. In the meantime, the information device having an imaging function as described above is referred to as an imaging device.

In such an imaging device, as a focus control method which focuses on a major subject, a contrast auto focus (AF) method or a phase difference AF method is employed. Since the phase difference AF method may detect a focusing position with high precision at a high speed as compared with the contrast AF method, the phase difference AF method is widely employed in various imaging devices (see, e.g., Patent Literature 1 (JP-A-2007-219539), Patent Literature 2 (JP-A-7-143391) and Patent Literature 3 (JP-A-2009-92824)).

In the phase difference AF method, outputs of a pair of phase detecting sensor rows are obtained as data and correlation of the outputs of the pair of sensor rows is obtained. Specifically, data of one of the sensor rows is assumed as A[1] A[k] and data of the other sensor row is assumed as B[1] B[k] and a value of "d" when an area S[d] enclosed by two data waveforms calculated by the following equation when the two data is displaced by "d" is at a minimum is calculated as a phase difference amount and a focus lens is driven based on the phase difference amount.

[Equation 1]

$$S[d] = \sum_{n=1}^{k} (A[n+d] - B[n])^2 \quad (1)$$
$$d = -L, \ldots, -2, -1, 0, 1, 2, \ldots, L$$

Patent Literature 1 discloses an imaging device which performs an optimal focus operation on a photosensitive member by changing a shift pitch (corresponding to an amount of change of d) of two images when correlation of two images formed on the pair of phase difference detecting sensors is operated in accordance with information (information on a permissible circle diameter of confusion) on the photosensitive member (a film or an imaging element) of a camera main body.

Patent Literature 2 discloses an imaging device which calculates a phase difference amount having L in Equation 1 as a first value, recalculates the phase difference amount by decreasing L to be smaller than the first value after moving the focus lens based on the phase difference amount, and moves the focus lens based on the phase difference amount.

Patent Literature 3 discloses an imaging device which varies a width of the phase difference detecting sensor row which is used to calculate the phase difference amount in accordance with a zoom magnification.

SUMMARY OF INVENTION

According to the imaging device disclosed in Patent Literatures 1 to 3, precision of the phase difference AF may be improved. However, redundant operation may be performed for the phase difference AF so that it cannot say that the operation for the phase difference AF is efficiently performed.

For example, when a subject which is slightly blurred and a subject which is significantly blurred are compared, the value of L of the subject which is slightly blurred becomes smaller than that of the subject which is significantly blurred. However, in Patent Literatures 1 and 3, regardless of the state of the subject, L is constant, so that the correlation operation may be unnecessarily performed.

In Patent Literature 2, even though the value of L is changed at the time of first correlation operation and second correlation operation, since the value of L is fixed in each correlation operation regardless of the state of the subject, the correlation operation may be unnecessarily performed.

In view of above, an object of the present invention is to provide an imaging device and a focus control method which may increase a speed of a phase difference AF by efficiently performing an operation of the phase difference amount.

An aspect of the present invention provides an imaging device, including: a sensor including a plurality of first phase difference detecting pixels which receives one of a pair of luminous fluxes which have passed through different parts of a pupil area of an imaging optical system and is arranged in a row direction and a plurality of second phase difference detecting pixels which receives the other one of the pair of luminous fluxes and is arranged in the row direction; a defocus amount calculating unit which calculates a correlated amount of a first output signal group and a second output signal group while shifting the first output signal group of the plurality of first phase difference detecting pixels and the second output signal group of the plurality of second phase difference detecting pixels in the row direction by an arbitrary amount to calculate a defocus amount from a first shift amount of the first output signal group and the second output signal group when the correlated amount is at a maximum; and a focus control unit which controls a focus state of the imaging optical system based on the defocus amount, in which the defocus amount calculating unit changes an upper limit of a shift amount of the first output signal group and the second output signal group in accordance with at least one of an F value of the imaging optical system, a focal distance of the imaging optical system, and a position of a focus lens included in the imaging optical system.

Another aspect of the present invention provides a focus control method by an imaging device which includes a sensor including a plurality of first phase difference detecting pixels which receives one of a pair of luminous fluxes which have passed through different parts of a pupil area of an imaging optical system and is arranged in a row direction and a plurality of second phase difference detecting pixels which receives the other one of the pair of luminous fluxes and is arranged in the row direction, the method including: a defocus amount calculating step of calculating a correlated amount of a first output signal group and a second output signal group while shifting the first output signal group of the plurality of first phase difference detecting pixels and the second output signal group of the plurality of second phase difference detecting pixels in the row direction by an arbitrary shift amount to calculate a defocus amount from a shifted mount of the first output signal group and the second output signal group when the correlated amount is at a maximum; and a focus control step of controlling a focus state of the imaging optical system based on the defocus amount, in which in the defocus amount calculating step, an upper limit of a shift amount of the first output signal group and the second output signal group is changed in accordance with at least one of an F value of the imaging optical system, a focal distance of the imaging optical system, and a position of a focus lens included in the imaging optical system.

Another aspect of the present invention provides an imaging device, including: an imaging element which includes a plurality of pixels which is two dimensionally arranged in a row direction and a column direction which is perpendicular to the row direction, the plurality of pixels including a plurality of imaging pixels which receives luminous fluxes which have passed through a pupil area of an imaging optical system, a plurality of first phase difference detecting pixels which receives one of a pair of luminous fluxes which have passed through different parts of the pupil area of the imaging optical system, and a plurality of second phase difference detecting pixels which receives the other one of the pair of luminous fluxes; a driving unit which performs rolling shutter driving to change an exposure period for every row of the pixels to read out a signal in accordance with a light receiving amount during the exposure from the pixels included in each row; a defocus amount calculating unit which calculates a correlated amount of a first output signal group and a second output signal group while shifting the first output signal group of the plurality of first phase difference detecting pixels which is included in one of two adjacent rows among rows of the pixels and a second output signal group of the plurality of second phase difference detecting pixels which is included in the other one of the two rows in the row direction by an arbitrary amount to calculate a defocus amount from a first shift amount of the first output signal group and the second output signal group when the correlated amount is at a maximum; a focus control unit which controls a focus state of the imaging optical system based on the defocus amount; and a shift amount calculating unit which calculates a second shift amount of the first output signal group and the second output signal group in the row direction caused by the rolling shutter driving, from a shift amount of the output signal groups in the row direction when a correlated amount between the output signal groups of the plurality of imaging pixels included in two adjacent rows among the rows of the pixels is at the maximum, in which the defocus amount calculating unit changes an upper limit of the shift amount of the first output signal group and the second output signal group in accordance with the second shift amount.

Another aspect of the present invention provides a focus control method by an imaging device which includes an imaging element which includes a plurality of pixels which is two dimensionally arranged in a row direction and a column direction which is perpendicular to the row direction, the plurality of pixels including a plurality of imaging pixels which receives luminous fluxes which have passed through a pupil area of an imaging optical system, a plurality of first phase difference detecting pixels which receives one of a pair of luminous fluxes which have passed through different parts of the pupil area of the imaging optical system, and a plurality of second phase difference detecting pixels which receives the other one of the pair of luminous fluxes, the method including: a driving step of performing rolling shutter driving to change an exposure period for every row of pixels to read out a signal in accordance with a light receiving amount during the exposure from the pixels included in each row; a defocus amount calculating step of calculating a correlated amount of a first output signal group and a second output signal group while shifting the first output signal group of the plurality of first phase difference detecting pixels which is included in one of two adjacent rows among rows of the pixels and a second output signal group of the plurality of second phase difference detecting pixels which is included in the other one of the two rows in the row direction by an arbitrary amount to calculate a defocus amount from a first shift amount of the first output signal group and the second output signal group when the correlated amount is at a maximum; a focus control step of controlling a focus state of the imaging optical system based on the defocus amount; and a shift amount calculating step of calculating a second shift amount of the first output signal group and the second output signal group in the row direction caused by the rolling shutter driving, from a shift amount of the output signal groups in the row direction when a correlated amount of the output signal groups of the plurality of imaging pixels included in two adjacent rows among the rows of pixels is at the maximum, in which in the defocus amount calculating step, an upper limit of the shift amount of the first output signal group and the second output signal group is changed in accordance with the second shift amount.

Any one of the aspects of the present invention may efficiently perform an operation of a phase difference amount to achieve high speed phase difference AF.

BRIEF DESCRIPTION OF DRAWINGS

FIG. 4 is a view illustrating an example of a table which is stored in a main memory of the digital camera illustrated in FIG. 1.

DESCRIPTION OF EMBODIMENTS

Hereinafter, an embodiment of the present invention will be described with reference to the drawings.

Figure 1:
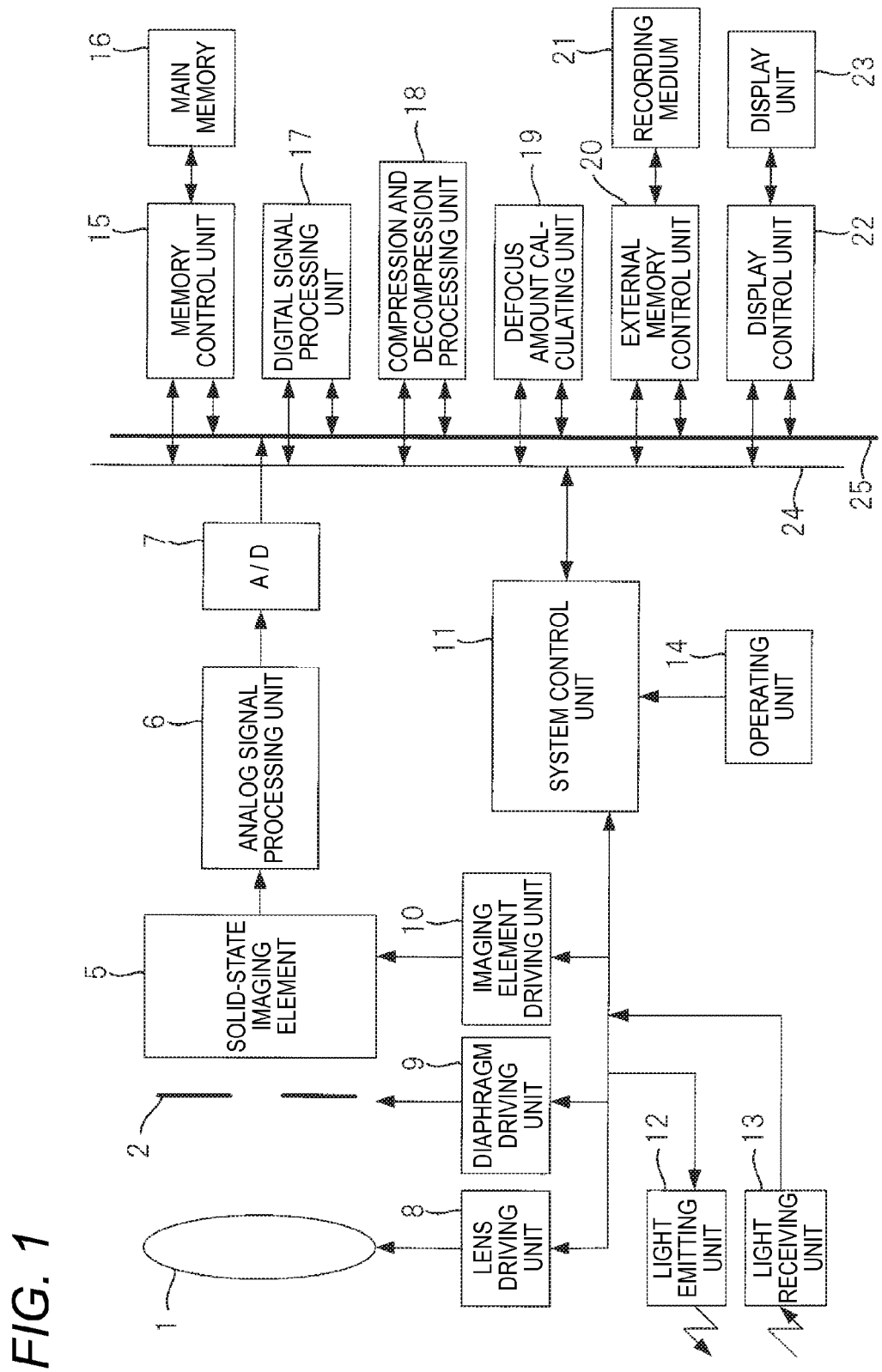
FIG. 1 is a diagram illustrating a schematic configuration of a digital camera as an example of an imaging device for explaining an embodiment of the present invention.

FIG. 1 is a diagram illustrating a schematic configuration of a digital camera as an example of an imaging device for explaining an embodiment of the present invention.

An imaging system of a digital camera illustrated in FIG. 1 includes a lens device (including a photographing lens 1 and a diaphragm 2) as an imaging optical system and a CMOS solid-state imaging element 5.

The lens device including the photographing lens 1 and the diaphragm 2 may be detachable from a camera main body or fixed to the camera main body. The photographing lens 1 includes a focus lens and a zoom lens. The focus lens refers to a lens which moves in a direction of an optical axis to adjust a focus position. The zoom lens refers to a lens which moves in the direction of the optical axis to change a focal distance and change an imaging angle of view. The imaging angle of view is a range which is captured by the imaging element and represented as an angle. Further, the focal distance refers to a distance from the lens to the imaging element when the focus is adjusted.

A system control unit 11 which collectively controls an entire electrical control system of the digital camera controls a flash light emitting unit 12 and a light receiving unit 13. Further, the system control unit 11 controls a lens driving unit 8 to adjust a position of a focus lens which is included in the photographing lens 1 or a position of the zoom lens which is included in the photographing lens 1. Moreover, the system control unit 11 controls an aperture size of the diaphragm 2 through a diaphragm driving unit 9 so as to adjust an exposure amount.

The system control unit 11 drives the solid-state imaging element 5 through an imaging element driving unit 10 to output a subject image captured through the photographing lens 1 as a captured image signal. An instruction signal from a user is input to the system control unit 11 through an operating unit 14.

The electrical control system of the digital camera further includes an analog signal processing unit 6 connected to an output of the solid-state imaging element 5 to perform an analog signal processing such as a correlated double sampling processing and an A/D converting circuit 7 which converts an analog signal output from the analog signal processing unit 6 into a digital signal. The analog signal processing unit 6 and the A/D converting circuit 7 are controlled by the system control unit 11. The analog signal processing unit 6 and the A/D converting circuit 7 may be embedded in the solid-state imaging element 5 in some cases.

The electrical control system of the digital camera includes a main memory 16, a memory control unit 15 which is connected to the main memory 16, a digital signal processing unit 17 which performs an interpolation operation, a gamma correction operation, and an RGB/YC conversion processing on a captured image signal output from the A/D converting circuit 7 to generate photographed image data, a compression and decompression processing unit 18 which decompresses the photographed image data generated in the digital signal processing unit 17 in a JPEG format or expands the compressed image data, a defocus amount calculating unit 19 which calculates a defocus amount, an external memory control unit 20 to which a detachable recording medium 21 is connected, and a display control unit 22 to which a display unit 23 mounted on a rear surface of a camera is connected. The memory control unit 15, the digital signal processing unit 17, the compression and expansion processing unit 18, the defocus amount calculating unit 19, the external memory control unit 20, and the display control unit 22 are connected to each other through a control bus 24 and a data bus 25 to be controlled by a command from the system control unit 11.

Figure 2:
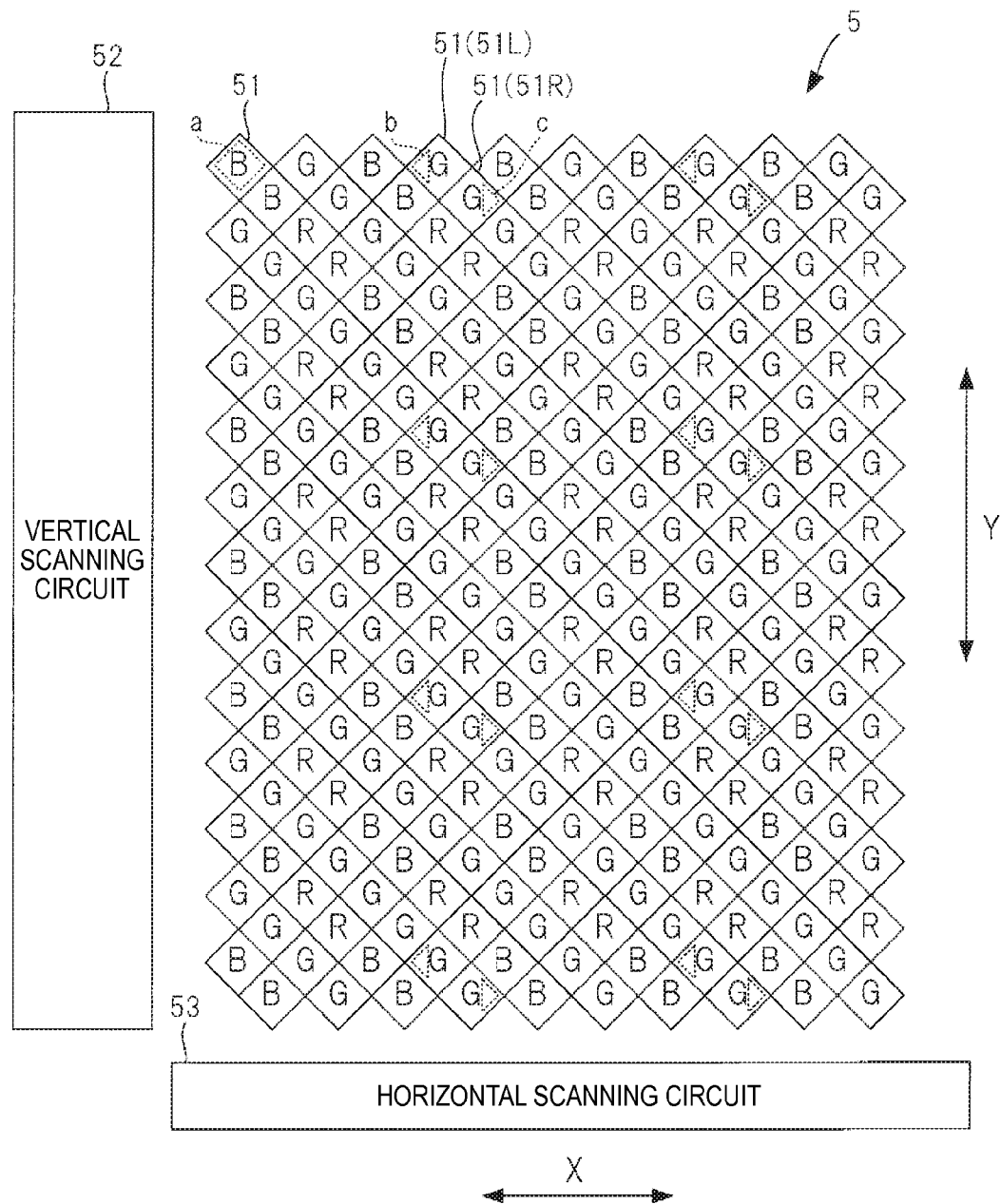
FIG. 2 is a schematic plan view illustrating a configuration of a solid-state imaging element 5 which is mounted in the digital camera illustrated in FIG. 1.

FIG. 2 is a schematic plan view illustrating a configuration of a solid-state imaging element 5 which is mounted in the digital camera illustrated in FIG. 1.

The solid-state imaging element 5 includes a plurality of pixels 51 (square blocks in the drawing) which is two-dimensionally arranged in a row direction X and a column direction Y, which is perpendicular to the row direction X. Even though all pixels 51 are not illustrated in FIG. 2, actually, millions to tens of millions of pixels 51 are two-dimensionally arranged. When an image is captured by a solid-state imaging element 5, output signals from a plurality of pixels 51 are individually obtained. A set of the plurality of output signals is referred to as a captured image signal in this specification.

Each pixel 51 includes a photoelectric converting unit such as a photodiode, a color filter which is formed above the photoelectric converting unit, and a signal output circuit which outputs a signal in accordance with signal charges which are accumulated in the photoelectric converting unit.

The signal output circuit is a well-known MOS circuit and, for example, is configured to include a charge accumulating unit to which charges accumulated in the photoelectric converting unit are transmitted, a transfer transistor which transfers the charges of the photoelectric converting unit to the charge accumulating unit, a reset transistor which resets a potential of the charge accumulating unit, an output transistor which outputs a signal in accordance with the potential of the charge accumulating unit, and a row selecting transistor which selectively outputs a signal from the output transistor to an output signal line.

In FIG. 2, a pixel 51 including a color filter which transmits a red light component is denoted by a reference character "R", a pixel 51 including a color filter which transmits a green light component is denoted by a reference character "G", and a pixel 50 including a color filter which transmits a blue light component is denoted by a reference character "B".

An arrangement of the plurality of pixels 51 is configured such that a plurality of pixel rows including a plurality of pixels 51 which is lined up in a row direction X is lined up in a column direction Y. Odd numbered pixel rows and even numbered pixel rows are off-centered by approximately a half of an arrangement pitch of the pixels 51 of each pixel row in the row direction X.

The color filters which are included in each pixel 51 of an odd-numbered pixel row are entirely arranged in a Bayer arrangement. Further the color filters which are included in each pixel 51 of an even-numbered pixel row are also entirely arranged in a Bayer arrangement. A pixel 51 in the odd-numbered row and a pixel 51 which detects the same color light component as the pixel 51 and is adjacent to the pixel 51 at a lower right side form a pair pixel.

According to the solid-state imaging element 5 having such a pixel arrangement, output signals of two pixels 51 which form the pair pixel are added to achieve a high sensitivity camera or exposure times of the two pixels 51 which configure the pair pixel are changed and output signals of the two pixels 51 are added to achieve a wide dynamic range of a camera.

In the solid-state imaging element 5, some of the plurality of pixels 51 serve as phase difference detecting pixels.

The phase difference detecting pixels include a plurality of phase difference detecting pixels 51R and a plurality of phase difference detecting pixels 51L.

The plurality of phase difference detecting pixels 51R receives one (for example, a luminous flux which has passed through a right half of the pupil area) of a pair of luminous fluxes which have passed through different parts of a pupil area of the photographing lens 1 and outputs a signal in accordance with an amount of received light. That is, the plurality of phase difference detecting pixels 51R provided in the solid-state imaging element 5 captures an image formed by one of the pair of luminous fluxes which have passed through different parts of the pupil area of the photographing lens 1.

The plurality of phase difference detecting pixels 51L receives the other one (for example, a luminous flux which has passed through a left half of the pupil area) of the pair of luminous fluxes and outputs a signal in accordance with an amount of received light. That is, the plurality of phase difference detecting pixels 51L provided in the solid-state imaging element 5 captures an image formed by the other one of the pair of luminous fluxes which have passed through different parts of the pupil area of the photographing lens 1.

In the meantime, a plurality of pixels 51 (hereinafter, referred to as imaging pixels) other than the phase difference detecting pixels 51R and 51L captures an image formed by a luminous flux which passes through almost all parts of the pupil area of the photographing lens 1.

A light shielding layer is provided above the photoelectric converting unit of the pixel 51 and an opening which defines a light receiving area of the photoelectric converting unit is formed in the light shielding layer.

A center of the opening (denoted by reference character "a" in FIG. 2) of the imaging pixel 51 coincides with a center (a center of a square block) of the photoelectric converting unit of the imaging pixel 51. In the meantime, in FIG. 2, in order to simplify the drawing, the opening a is illustrated only in a part of the imaging pixels 51.

To the contrary, a center of an opening (denoted by reference character "c" in FIG. 2) of the phase difference detecting pixel 51R is off-centered to the right with respect to the center of the photoelectric converting unit of the phase difference detecting pixel 51R.

A center of an opening (denoted by reference character "b" in FIG. 2) of the phase difference detecting pixel 51L is off-centered to the left with respect to the center of the photoelectric converting unit of the phase difference detecting pixel 51L.

In the solid-state imaging element 5, a part of the pixels 51 on which a green color filter is mounted serve as the phase difference detecting pixels 51R or the phase difference detecting pixels 51L. Of course, a pixel on which other color filter is mounted may serve as the phase difference detecting pixel.

The phase difference detecting pixel 51R and the phase difference detecting pixel 51L are discretely and periodically arranged in a region where the pixels 51 are disposed.

The phase difference detecting pixels 51R are disposed at intervals of three pixels 51 in the row direction X in a part (four pixel rows which are lined up at intervals of three pixel rows in the example of FIG. 2) of the even-numbered pixel rows, in the example of FIG. 2.

In the example of FIG. 2, the phase difference detecting pixels 51L are disposed with the same cycle as the phase difference detecting pixels 51R in the row direction X in the part (a pixel row next to the pixel row including the phase difference detecting pixel 51R) of the odd-numbered pixel rows.

With this configuration, among light components which pass through the opening b of the light shielding layer to be received by the pixel 51L, a light component which is received from the left side as seen from a subject of the photographing lens 1 provided on an upper portion of the sheet of FIG. 2, that is, a light component which enters from a direction where the subject is watched with a right eye becomes a main component. Further, among light components which pass through the opening c of the light shielding layer to be received by the pixel 51R, a light component which is received from the right side as seen from the subject of the photographing lens 1, that is, a light component which enters from a direction where the subject is watched with a left eye becomes a main component.

That is, a captured image signal which is obtained by seeing the subject with the left eye may be obtained by all the phase difference detecting pixels 51R and a captured image signal which is obtained by seeing the subject with the right eye may be obtained by all the phase difference detecting pixels 51L. Therefore, stereoscopic image data of the subject may be generated by combining both the image signals or phase difference amount may be calculated by correlating both the image signals.

In the meantime, the phase difference detecting pixel 51R and the phase difference detecting pixel 51L are adapted to cause the opening of the light shielding layer to be off-centered in a reverse direction to receive the luminous fluxes which pass through the different parts of the pupil area of the photographing lens 1 to obtain a phase difference amount. However, a structure for obtaining the phase difference amount is not limited thereto, but other known structures may be employed.

The solid-state imaging element 5 further includes a vertical scanning circuit 52 and a horizontal scanning circuit 53.

The vertical scanning circuit 52 controls to turn on/off a transfer transistor, a reset transistor, and a row selecting transistor of a signal output circuit which is included in each pixel 51.

The horizontal scanning circuit 53 is connected to an output signal line which is provided for every pixel column which is formed by pixels 51 which are parallel to each other in the column direction Y and sequentially outputs an output signal, which is output from each pixel 51 in the pixel row to the output signal line, to the outside of the solid-state imaging element 5.

The vertical scanning circuit 52 and the horizontal scanning circuit 53 operate in accordance with an instruction of the imaging element driving unit 10 illustrated in FIG. 1. The imaging element driving unit 10 drives the solid-state imaging element 5 by a so-called rolling shutter method in which every pixel row is shifted to be exposed by a predetermined time.

An exposure period of each pixel 51 of the pixel row starts at a time when the reset transistor of each pixel 51 is turned on and a potential of the charge accumulating unit which is included in each pixel 51 is reset and ends at a time when the transfer transistor which is included in each pixel 51 is turned on and the charges accumulated in the photoelectric converting unit of each pixel 51 are completely transmitted to the charge accumulating unit. The imaging element driving unit 10 controls the vertical scanning circuit 52 so that starting timings of the exposure period vary at every pixel row.

The defocus amount calculating unit 19 illustrated in FIG. 1 uses an output signal group read out from the phase difference detecting pixel 51L and the phase difference detecting pixel 51R to calculate a phase difference amount which is a relative off-centered amount of two images formed by the pair of luminous fluxes. The defocus amount calculating unit 19 calculates a focus adjusted state of the photographing lens 1, in this case, an amount by which the photographing lens 1 deviates from a focused state and a direction thereof, that is, a defocus amount, based on the phase difference amount.

The system control unit 11 illustrated in FIG. 1 moves a focus lens included in the photographing lens 1 to a focus position based on the defocus amount calculated by the defocus amount calculating unit 19 to control the focused state of the photographing lens 1.

Next, a method of calculating a phase difference amount by the defocus amount calculating unit 19 will be described in detail.

The defocus amount calculating unit 19 calculates the phase difference amount using output signals read out from two pixel rows of the pixel row including the phase difference detecting pixels 51R and the pixel row including the phase difference detecting pixels 51L which are adjacent to the phase difference detecting pixels 51R.

In the meantime, in this specification, two adjacent pixels (or pixel rows) refer to two pixels (or pixel rows) which are adjacent to each other such an extent that the light is received from the substantially same subject part.

Figure 3:
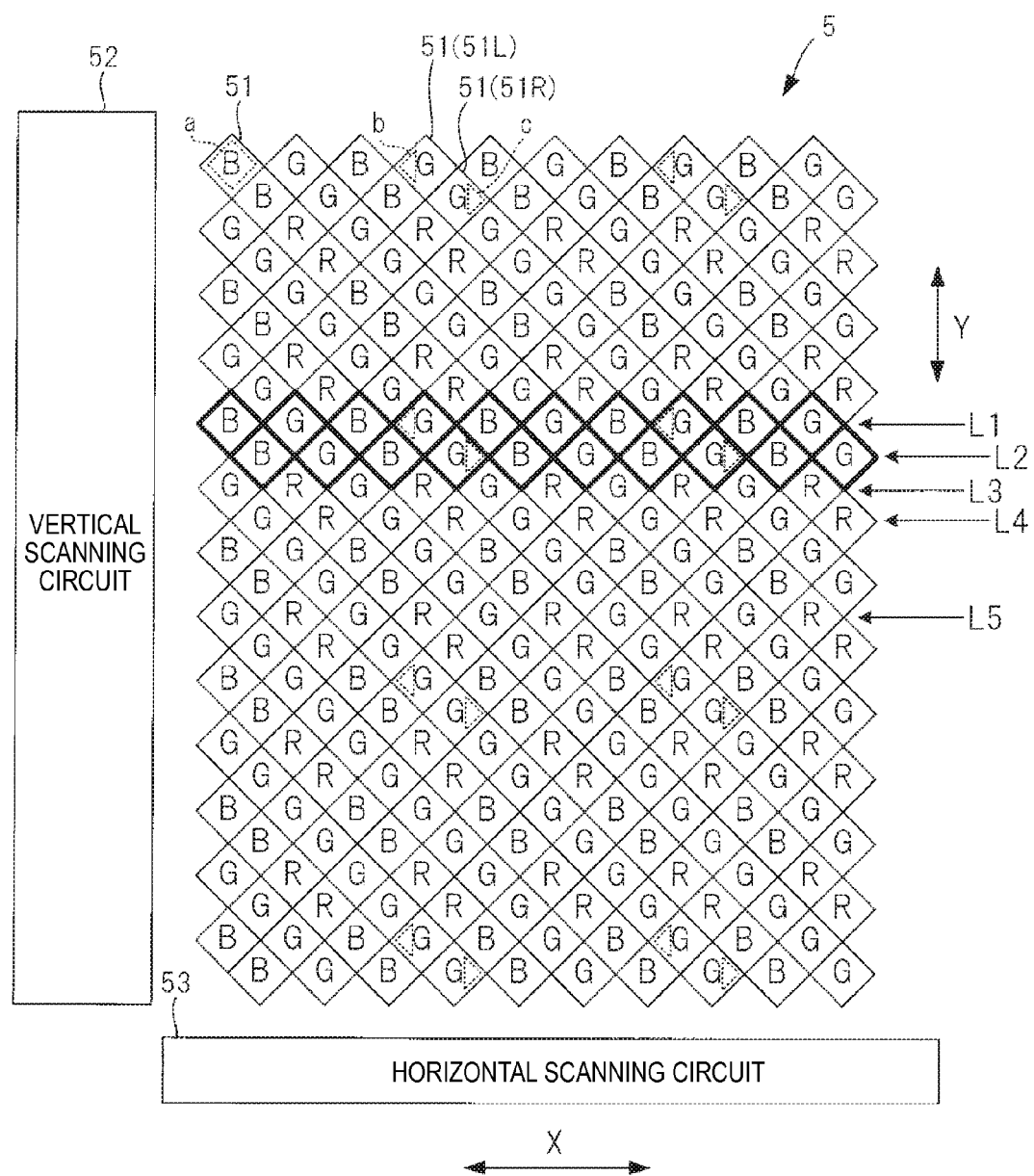
FIG. 3 is a view illustrating an example of two pixel rows which is used for correlation operation, in the solid-state imaging element 5 illustrated in FIG. 2.

In a signal group output from two adjacent pixel rows (a pixel row L1 and a pixel row L2) enclosed by a thick line in FIG. 3, the defocus amount calculating unit 19 sequentially denotes output signals of the phase difference detecting pixels 51R included in the pixel row L1 as A[1], . . . , A[k] from the left in the row direction X of the phase difference detecting pixels 51R.

The defocus amount calculating unit 19 sequentially denotes output signals of the phase difference detecting pixels 51L included in the pixel row L2 as B[1], . . . , B[k] from the left in the row direction X of the phase difference detecting pixels 51L.

A signal A[n] and a signal B[n] (n=1, 2, 3, . . . , k) are output signals of the adjacent phase difference detecting pixel 51R and phase difference detecting pixel 51L (the phase difference detecting pixel 51R and the phase difference detecting pixel 51L which form a pair pixel).

The defocus amount calculating unit 19 calculates an area S[d] corresponding a correlated amount of an image (corresponding to an output signal group of a plurality of phase difference detecting pixels 51L included in the pixel row L1) captured by the phase difference detecting pixels 51L of the pixel row L1 and an image (corresponding to an output signal group of a plurality of phase difference detecting pixels 51R included in the pixel row L2) captured by the phase difference detecting pixel 51R of the pixel row L2 by operation of above Equation 1. It means that as a value of the area S[d] is smaller, a correlated amount of the two images is larger.

The defocus amount calculating unit 19 calculates a value of "d" when among all S[d] obtained by incrementing a value of "d" in Equation 1 by unit amount (for example, "1", which is arbitrarily determined) in a range of L to −L, S[d] has a minimum value (in other words, the correlated amount of the two images is at a maximum), as the phase difference amount.

In the embodiment, in order to optimize a computational amount of a correlation operation by Equation 1, the defocus amount calculating unit 19 changes the value of L (a positive upper limit which shifts two images when the correlation operation is performed. Hereinafter, referred to as a shift amount) in accordance with an F value of the diaphragm 2, a focal distance (a position of the zoom lens) of the photographing lens 1, and a position (a focus position) of the focus lens included in the photographing lens 1. The F value is a value (which becomes smaller at a diaphragm opening side) determined by an aperture size of the diaphragm.

It is determined whether the subject is significantly blurred or slightly blurred by the combination of the F value, the focal distance, and the focus position. When the subject is slightly blurred, the phase difference amount d becomes smaller as compared with a situation when the subject is significantly blurred.

Therefore, the defocus amount calculating unit 19 makes a value of the shift amount L when the subject is slightly blurred smaller than a value of the shift amount when the subject is significantly blurred. By doing this, the number of operations for S[d] in Equation 1 is reduced, so that an unnecessary operation may be omitted.

A relationship between the combination of the F value and the focal distance and the shift amount L is experimentally obtained in advance and a table illustrated in FIG. 4 is previously stored in the main memory 16. In the meantime, the table illustrated in FIG. 4 is a table when the focus position is at an MOD or INF (both ends of the focus lens in a movable range).

When it is assumed that a movement amount from an end of the focus lens to the other end is M and a variation of the defocus amount when the focus lens moves by the movement amount M is Md, a maximum value which is capable of being set as the shift amount L is obtained by back calculating the phase difference amount from the variation Md. Since the table illustrated in FIG. 4 is a table when the focus position is at an MOD or INF, L=96 is a maximum value of the shift amount L which is capable of being set by the defocus amount calculating unit 19.

As the F value is increased, blurring of the subject is reduced (separation of the image is reduced), so that even though the movement amounts of the focus lens required for focusing are equal, the phase difference amount is reduced. Further, as the focal distance is decreased, blurring of the subject is reduced (separation of the image is reduced), so that even though the movement amounts of the focus lens required for focusing are equal, the phase difference amount is reduced.

As described above, in accordance with the combination of the F value and the focal distance, a maximum value of the phase difference amount varies.

Therefore, as illustrated in FIG. 4, a table in which a value of the shift amount L corresponding to the maximum value of the phase difference amount varies depending on the combination of the F value and the focal distance may be created.

In the meantime, a value (hereinafter, also referred to as a required focus movement amount) which is minimally required for the movement amount of the focus lens has M as an upper limit when the focus position is at the MOD and the INF. However, when the focus position is between the MOD and the INF, the upper limit of the required focus movement amount becomes smaller than M.

For example, when the focus position is in the middle of the MOD and the INF, the required focus movement amount is M/2 at maximum. Therefore, in this case, even when each numerical value of L in the table illustrated in FIG. 4 is halved, the focus control may be performed without incurring any problems.

The defocus amount calculating unit 19 determines a maximum value of the required focus movement amount from focus position information at a time when the phase difference AF is performed and processes a table illustrated in FIG. 4 in accordance with the determined maximum to determine the shift amount L.

Specifically, the defocus amount calculating unit 19 calculates a distance between the current position of the focus lens and the MOD and a distance between the current position of the focus lens and the INF to consider a larger one of the two distances as a maximum value Ma of the required focus movement amount corresponding to all combinations of the F value and the focal distance. Further, the defocus amount calculating unit 19 selects a numerical value corresponding to the combination of the F value and the focal distance obtained from the system control unit 11, from the table of FIG. 4 to determine a value (rounding off to the nearest whole number) obtained by multiplying the numerical value and the Ma/M as the shift amount L.

For example, when the focus position is in the middle of the middle of the INF and the MOD and the INF, the F value is F2.0 and the focal distance is 56 or larger and smaller than 100, the defocus amount calculating unit 19 determines 32×(¾)=24 as the shift amount L.

In the meantime, the table illustrated in FIG. 4 is created for every focus position and is stored in the main memory 16 and the defocus amount calculating unit 19 may determine the shift amount L from the table corresponding to the focus position and the F value and the focal position.

An operation of a digital camera configured as described above will be described.

Figure 5:
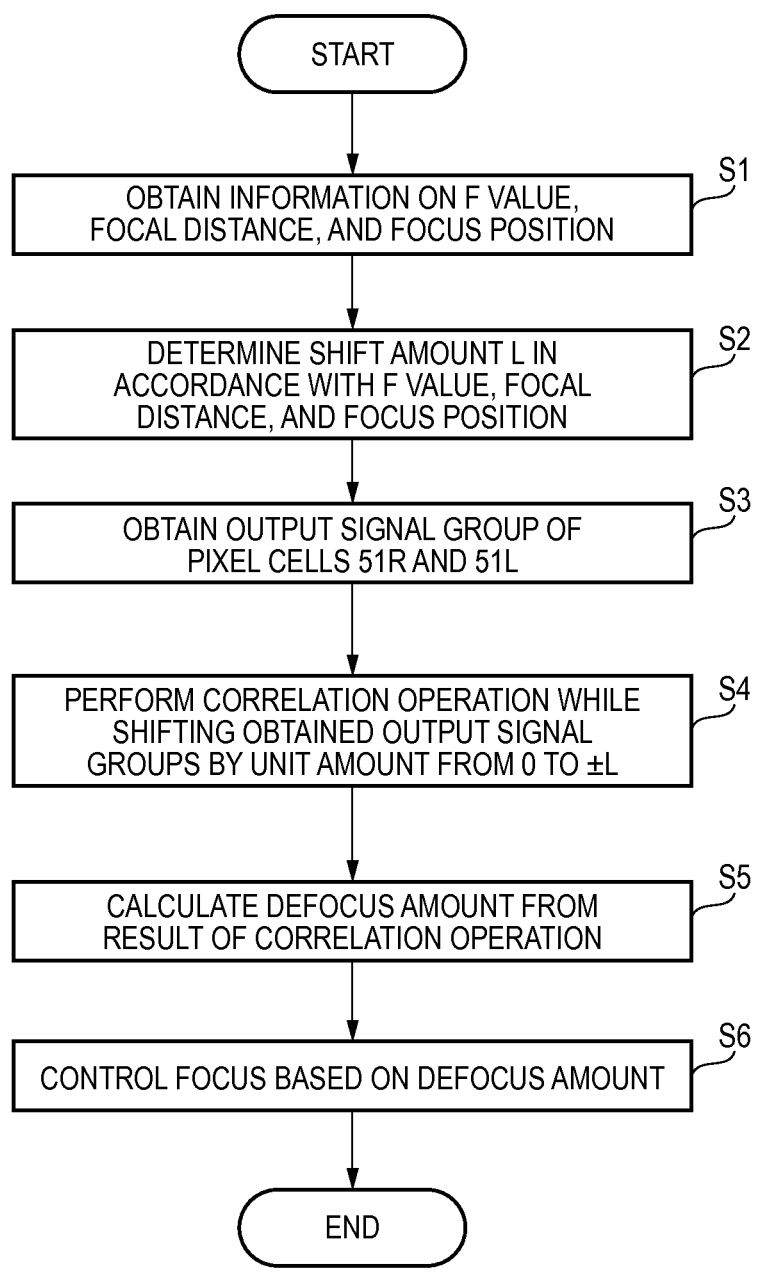
FIG. 5 is a flow chart for explaining an operation of the digital camera illustrated in FIG. 1.

FIG. 5 is a flow chart for explaining a phase difference AF operation of the digital camera illustrated in FIG. 1.

When there is an instruction to perform a phase difference AF, imaging for the phase difference AF is performed by the solid-state imaging element 5 by the control of the system control unit 11 and the captured image signal output from the solid-state imaging element 5 by the imaging is stored in the main memory 16.

The defocus amount calculating unit 19 obtains information on an F value of the diaphragm 2 at a time when there is the instruction to perform the phase difference AF, a focal distance determined by a position of the zoom lens, and a position of the focus lens from the system control unit 11 (step S1).

Next, the defocus amount calculating unit 19 determines the shift amount L using the information obtained in step S1 and the table stored in the main memory 16 (step S2).

Next, the defocus amount calculating unit 19 obtains an output signal group of the phase difference detecting pixel 51L obtained from the pixel row L1 and an output signal group of the phase difference detecting pixel 51R obtained from the pixel row L2 which are included in the captured image signal stored in the main memory 16 (step S3).

Next, the defocus amount calculating unit 19 performs the correlation operation represented in Equation 1 using the output signals obtained in step S3 (step S4). Here, as the shift amount L, a value determined in step S2 is used.

As a result of the correlation operation, the defocus amount calculating unit 19 considers a value of "d" when the S[D] is at a minimum as the phase difference amount. The defocus amount calculating unit 19 performs the processes of steps S3 and S4 for every two pixel rows including the phase difference detecting pixel 51R and the phase difference detecting pixel 51L which forms a pair pixel with the phase difference detecting pixel 51R to calculate a plurality of phase difference amounts.

The defocus amount calculating unit 19 calculates a defocus amount using the plurality of phase difference amounts (step S5). For example, the defocus amount calculating unit 19 averages out the plurality of phase difference amounts and calculates the defocus amount based on the averaged phase difference amount.

When the defocus amount is calculated, the system control unit 11 drives a position of the focus lens based on the defocus amount to control the focus (step S6).

As described above, according to the digital camera illustrated in FIG. 1, since the shift amount L is determined in accordance with the F value, the focal distance, and the focus position, as compared with a case when the shift amount L is always fixed, it is possible to prevent an unnecessary correlation operation from being performed, thereby making it possible to perform the phase difference AF at a high speed.

Next, a modified embodiment of the digital camera illustrated in FIG. 1 will be described.

First Modified Embodiment

In the digital camera illustrated in FIG. 1, the imaging element driving unit 10 drives the solid-state imaging element 5 in a rolling shutter manner. In the rolling shutter manner, exposure timings for every pixel row are slightly shifted. Therefore, when the subject is moving, even though the two pixel rows are adjacent to each other, a distortion of an image caused by the rolling shutter driving may be formed between the output signal groups obtained from the two pixel rows as a phase difference in some cases.

Therefore, when a phase difference D caused by the rolling shutter driving is generated, even when S[D] is at a minimum in d=L or d=-L, actually, S[L+D] or S[-(L+D)] may be smaller than the minimum S[d].

Therefore, in the first modified embodiment, the defocus amount calculating unit 19 calculates a shift amount L' obtained by adding the phase difference D caused by the rolling shutter driving to the value of the shift amount L determined in accordance with the F value, the focal distance, and the focus position and d where S[d] is at a minimum is calculated as a phase difference amount by the following Equation 2. In Equation 2, upper limits of the shift amount of two images in Equation 1 are substituted with L'.

[Equation 2]

$$S[d] = \sum_{n=1}^{k} (A[n+d] - B[n])^2 \quad (2)$$

$$d = -L', \ldots, -2, -1, 0, 1, 2, \ldots, L'$$

The phase difference D may be obtained by correlation operation of output signals of the imaging pixels 51 which are included in the two adjacent pixel rows.

For example, the defocus amount calculating unit 19 assumes output signals of the imaging pixel 51 included in a pixel row L1 illustrated in FIG. 3 as E[1], E[k] and output signals of the imaging pixel 51 included in a pixel row L2 as F[1], F[k] and calculates a value of d where S[d] calculated from the following Equation 3 is at a minimum as a phase difference D.

In the meantime, an upper limit La of the shift amount of two images in Equation 3 has been determined in advance by the number of pixel rows between the pixel row of the output source of E[1], E[k] and the pixel row of the output source of F[1], F[k] and a read-out speed of the imaging element. As the number becomes smaller and the read-out speed becomes higher, the phase difference D becomes smaller, so that when the number becomes smaller and the read-out speed becomes higher, La may be set to be smaller.

[Equation 3]

$$S[d] = \sum_{n=1}^{k} (E[n+d] - F[n])^2 \quad (3)$$
$$d = -La, \ldots, -2, -1, 0, 1, 2, \ldots, La$$

Figure 6:
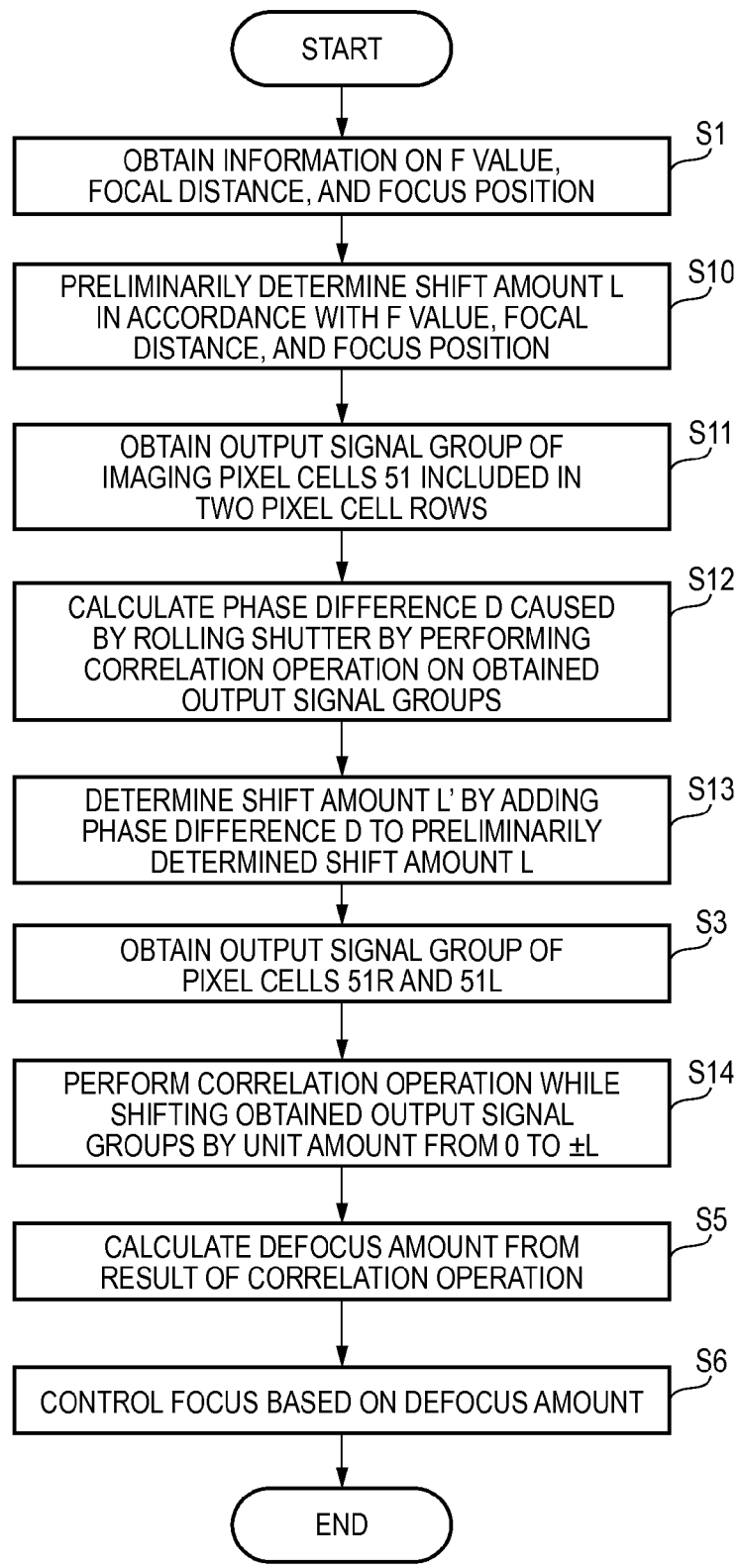
FIG. 6 is a flow chart for explaining a modified embodiment of a phase difference AF operation of the digital camera illustrated in FIG. 1.

FIG. 6 is a flow chart for explaining a modified embodiment of a phase difference AF operation of the digital camera illustrated in FIG. 1. In FIG. 6, the same processings as those illustrated in FIG. 5 are denoted by the same reference numerals and descriptions thereof will be omitted.

Aster step S1, the defocus amount calculating unit 19 preliminarily determines the shift amount L using the information obtained in step S1 and the table stored in the main memory 16 (step S10).

Next, the defocus amount calculating unit 19 obtains an output signal group of imaging pixels 51 obtained from the pixel row L1 and an output signal group of imaging pixels 51 obtained from the pixel row L2, among the captured image signals stored in the main memory 16 (step S11).

Next, the defocus amount calculating unit 19 calculates a phase difference D by the rolling shutter, using two output signal groups obtained in step S11 and Equation 3 (step S12).

Next, the defocus amount calculating unit 19 assumes a value obtained by adding the phase difference D calculated in step S12 to the shift amount L which is preliminarily determined in step S10 as a shift amount L' (step S13).

Next, the defocus amount calculating unit 19 performs the process of step S3 and operates Equation 2 using the output signal obtained in step S3 and calculates d when S[d] is at a minimum as a phase difference amount (step S14).

The defocus amount calculating unit 19 performs the processes of steps S3 and S14 for every two pixel rows including the phase difference detecting pixel 51R and the phase difference detecting pixel 51L which forms a pair pixel with the phase difference detecting pixel 51R to calculate a plurality of phase difference amounts.

The defocus amount calculating unit 19 calculates a defocus amount using the plurality of phase difference amounts (step S5). Next, the focus control is performed based on the defocus amount (step S6).

As described above, according to the first modified embodiment, even when distortion due to the rolling shutter driving occurs between two images which are targets for the correlation operation, the defocus amount may be precisely calculated.

In the meantime, in FIG. 6, in step S11 and step S3, output signals obtained from all pixel rows L1 and L2 are obtained. By doing this, in the case of phase difference AF, there is no need to read signals from a pixel row other than the pixel row including the phase difference detecting pixels 51R and 51L, that is, a pixel row including only the imaging pixel 51. Therefore, a signal used for the phase difference AF is read out at a high speed, so that high speed phase difference AF may be achieved.

In the meantime, two output signal groups which are used to calculate a phase difference D due to the rolling shutter driving may be obtained from the pixel row including only the imaging pixel 51.

For example, in step S11 of FIG. 6, the correlation operation may be performed using output signal groups obtained from a pixel row L3 and a pixel row L4 illustrated in FIG. 3 to calculate the phase difference D.

The two output signal groups which are used to calculate the phase difference D may be obtained from two adjacent pixel rows and for example, the phase difference D may be calculated using the output signal groups obtained from the pixel row L3 and the pixel row L5 illustrated in FIG. 3.

In this case, the defocus amount calculating unit 19 obtains the value of d when a left side of Equation 3 is at a minimum, as the phase difference D and a value of D obtained here is four times of the phase difference D calculated using the output signal groups obtained from the pixel row L3 and the pixel row L4. Therefore, a value obtained by dividing the value of d when the left side of Equation 3 is at a minimum by four becomes a final phase difference D.

In the meantime, in the first modified embodiment, the shift amount L is preliminarily determined depending on the F value, the focal distance, and the focus position and then the phase difference D is added to the shift amount L to obtain the final shift amount L'.

However, the shift amount L to be preliminarily determined may be a fixed value regardless of the F value, the focal distance, and the focus position. In this case, even though the correlation operation may be not optimized in accordance with the blurring state of the subject, the correlation operation may be performed in consideration of the distortion of the image caused by the rolling shutter driving. Therefore, the precision of the phase difference AF may be improved.

In the meantime, in the above description, the rolling shutter driving in which an exposure period varies is performed on all pixel rows included in the solid-state imaging element 5. However, the rolling shutter driving may be performed only on a part of all pixel rows, that is, on a row including the phase difference detecting pixels 51R and 51L and global shutter driving may be performed on the other pixel rows.

Until now, the pixels 51 are exemplified to be arranged in a so-called honey comb arrangement, but the present invention is applicable to a solid-state imaging element in which the pixels 51 are arranged in a square lattice pattern.

Figure 7:
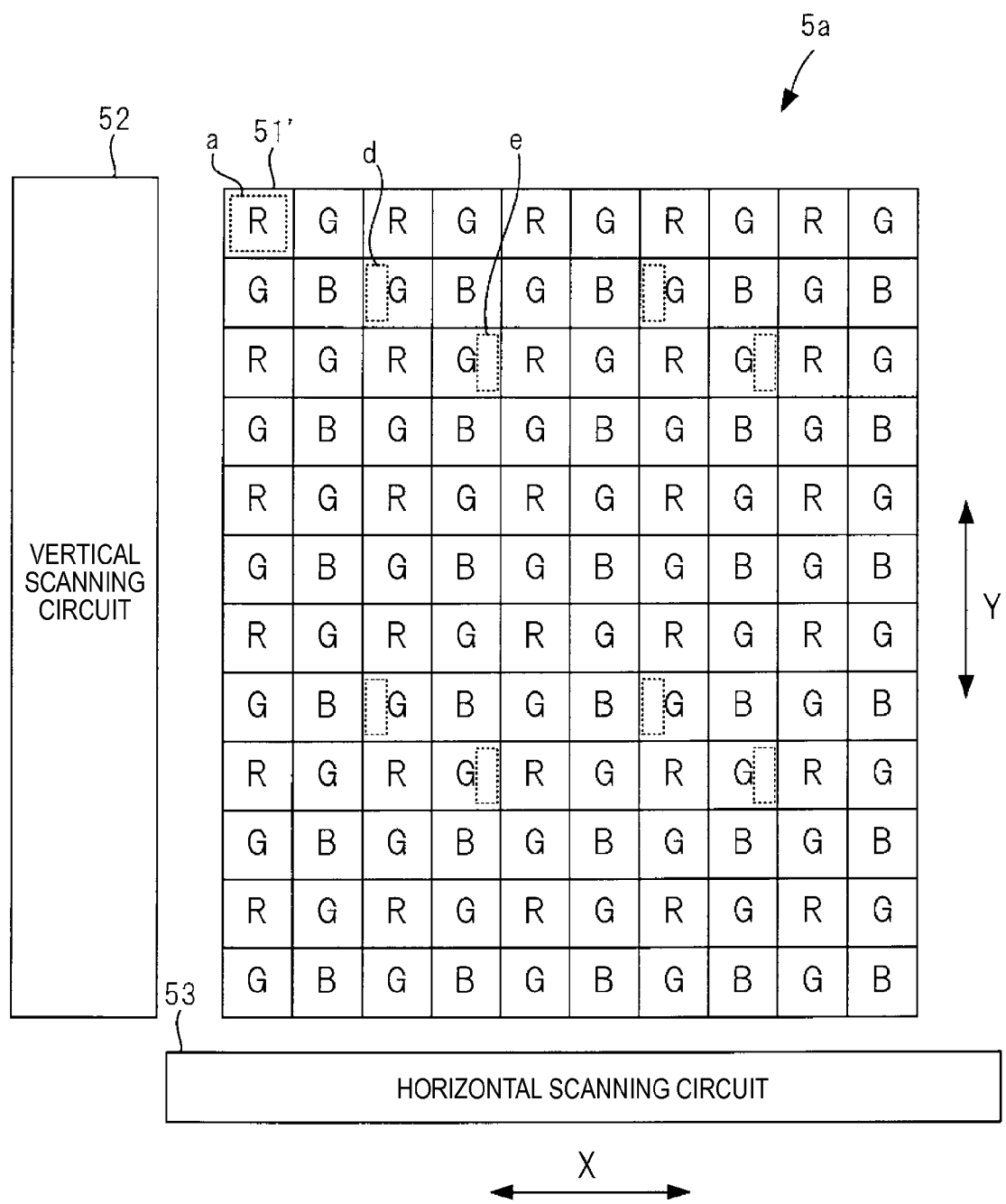
FIG. 7 is a view illustrating a solid-state imaging element 5a which is a modified embodiment of the solid-state imaging element 5 illustrated in FIG. 2.

FIG. 7 is a view illustrating a solid-state imaging element 5a which is a modified embodiment of the solid-state imaging element 5 illustrated in FIG. 2.

A solid-state imaging element 5a includes a plurality of pixels 51 which is arranged in a square lattice pattern in a row direction X and a column direction Y, a vertical scanning circuit 52, and a horizontal scanning circuit 53. A configuration of the pixels 51' is the same as the configuration of the pixels 51 and an arrangement of the color filters is a Bayer arrangement.

The plurality of pixels 51' includes normal pixels 51' in which an opening a of a light shielding layer is not off-centered and phase difference detecting pixels having off-centered openings d and e. The pixel 51' having the opening d corresponds to the phase difference detecting pixel 51L and the pixel 51' having the opening e corresponds to the phase difference detecting pixel 51R.

Also in the solid-state imaging element 5*a* with the above-described configuration, the shift amount L is determined by the above-described method, so that the high speed phase difference AF may be performed.

In FIGS. 2 and 7, even though positions of the row direction of the adjacent phase difference detecting pixel 51R and phase difference detecting pixel 51L are shifted by one pixel amount, the positions of the row direction of the adjacent phase difference detecting pixel 51R and phase difference detecting pixel 51L may be the same.

Until now, even though the solid-state imaging elements 5 and 5*a* having mounted thereon color filters having a plurality of colors to perform color imaging, the solid-state imaging elements 5 and 5*a* may be an imaging element for monochromic imaging in which a green filter which is a single color is mounted as the color filter or the color filter is omitted.

In an example other than the first modified embodiment, a CCD type solid-state imaging element may be used as the solid-state imaging element 5.

In the above description, the solid-state imaging element 5 serves as an imaging element for imaging and phase difference detecting in which the imaging pixel 51 and the phase difference detecting pixels 51R and 51L are mixed. However, the phase difference AF process illustrated in FIG. 5 may be performed by providing an exclusive element for the phase difference AF which does not have the imaging pixel 51 in the camera separately from the solid-state imaging element 5 and using an output signal from this element.

In the above description, the defocus amount calculating unit 19 determines a shift amount L in accordance with the F value, the focal distance, and the focus position. However, even though the defocus amount calculating unit 19 is configured to determine the shift amount L in accordance with one of them, the operation for phase difference AF may be efficiently performed.

In this specification, the digital camera is exemplified as the imaging device, but an embodiment of a smart phone including a camera as an imaging device will be described below.

Figure 8:
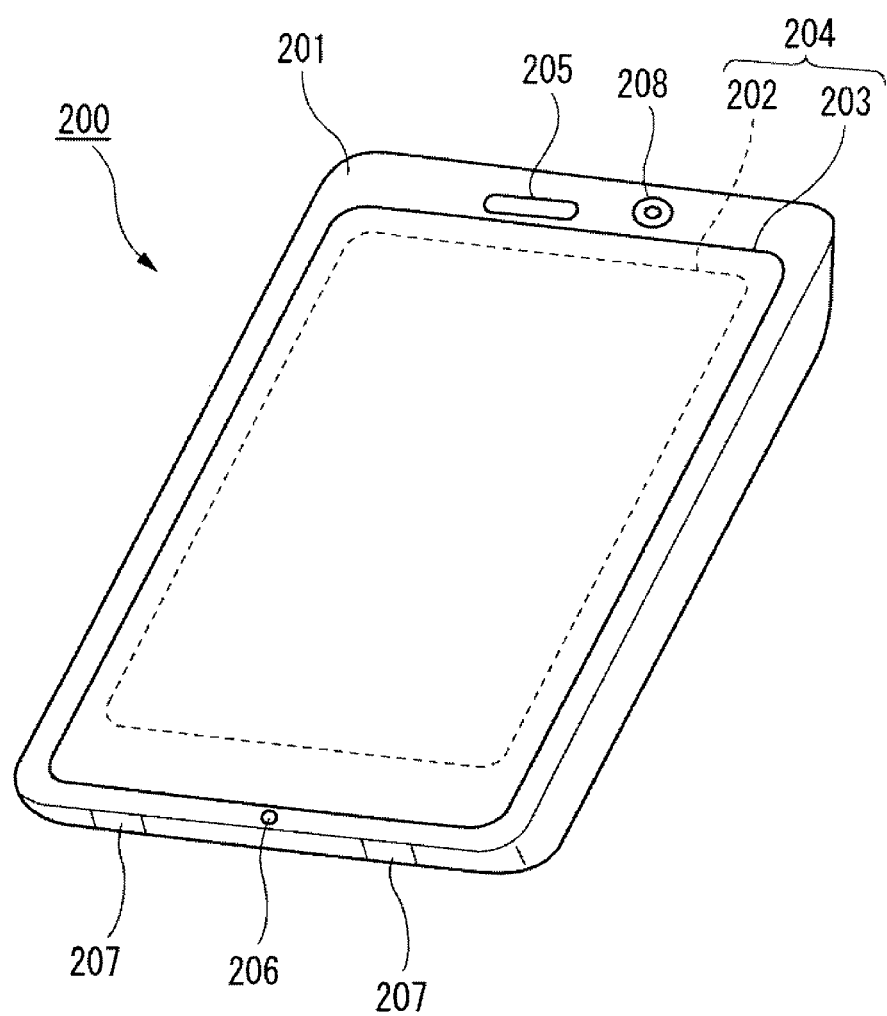
FIG. 8 is a view explaining a smart phone as an imaging device.

FIG. 8 illustrates an outer appearance of a smart phone 200 which is an embodiment of a photographing device of the present invention. The smart phone 200 illustrated in FIG. 8 includes a flat panel type housing 201 and is provided, on one surface of the housing 201, with a display input unit 204 in which a display panel 202 as a display unit, and an operating panel 203 as an input unit are integrated. In addition, the housing 201 includes a speaker 205, a microphone 206, an operating unit 207, and a camera 208. However, a configuration of the housing 201 is not limited thereto. For example, a configuration in which the display unit and the input unit are independent from each other may be employed or a configuration having a folding structure or a slide mechanism may be employed.

Figure 9:
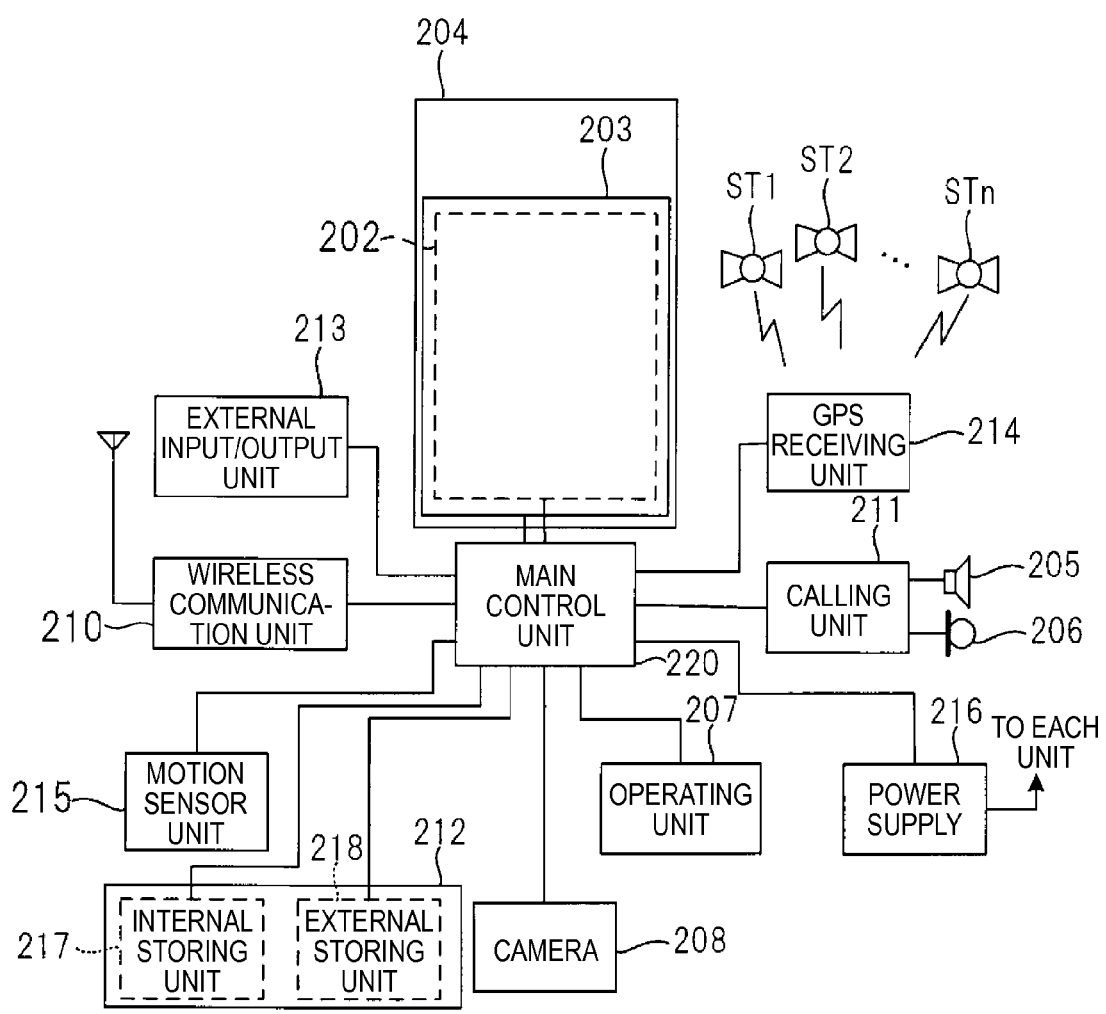
FIG. 9 is an internal block diagram of the smart phone of FIG. 8.

FIG. 9 is a block diagram illustrating a configuration of the smart phone 200 illustrated in FIG. 8. As illustrated in FIG. 8, as main components, the smart phone includes a wireless communication unit 210, a display input unit 204, a calling unit 211, an operating unit 207, a camera 208, a storing unit 212, an external input/output unit 213, a global positioning system (GPS) receiving unit 214, a motion sensor unit 215, a power supply 216, and a main control unit 220. Further, as a main function of the smart phone 200, the smart phone 200 is provided with a wireless communication function which performs mobile wireless communication through a base station device BS which is not illustrated and a mobile communication network NW which is not illustrated.

The wireless communication unit 210 performs wireless communication with a base station device BS which is accommodated in a mobile communication network NW in accordance with an instruction of the main control unit 220. Using the wireless communication, the wireless communication unit 210 transmits/receives various file data such as voice data and image data and electronic mail data or receives web data, streaming data, or the like.

The display input unit 204 is provided with a display panel 202 and an operating panel 203 as a so-called touch panel which displays an image (a still image or a moving picture) or text information under the control of the main control unit 220 so as to visually transmit information to a user, and detects the user's operation on displayed information.

The display panel 202 uses a liquid crystal display (LCD), an organic electro-luminescence display (OELD), or the like, as a display device.

The operating panel 203 is a device which is disposed to allow an image displayed on a display surface of the display panel 202 to be visually recognized and detects one or a plurality of coordinates which can be operated by a finger of the user or a stylus. When the device is operated by the finger of the user or the stylus, a detection signal which is generated based on the operation is output to the main control unit 220. Subsequently, the main control unit 220 detects an operating position (coordinate) on the display panel 202, based on the received detection signal.

As illustrated in FIG. 8, although the display panel 202 and the operating panel 203 of the smart phone 200 exemplified as an embodiment of the photographing device of the present invention are integrated with each other to constitute the display input unit 204, the operating panel 203 is disposed to completely cover the display panel 202.

When such an arrangement is employed, the operating panel 203 may be provided with a function of detecting the user's operation on a region other than the display panel 202. In other words, the operating panel 203 may include a detection region (hereinafter, referred to as a display region) on an overlapping portion which overlaps the display panel 202 and a detection region (hereinafter, referred to as a "non-display region") for other outer peripheral portion which does not overlap the display panel 202.

In the meantime, although the size of the display region and the size of the display panel 202 may completely coincide with each other, both sizes do not necessarily coincide with each other. In addition, the operating panel 203 may include two sensitive regions of an outer peripheral portion and an inner portion other than the outer peripheral portion. Moreover, a width of the outer peripheral portion is appropriately designed in accordance with the size of the housing 201. Moreover, as a position detecting system employed in the operating panel 203, a matrix switch system, a resistive layer system, a surface elastic wave system, an infrared system, an electromagnetic induction system, or an electrostatic capacitive system may be exemplified, and any system may be employed.

The calling unit 211 includes the speaker 205 or the microphone 206 and converts the user's voice input through the microphone 206 into voice data to be processed by the main control unit 220 and outputs the converted voice data to the main control unit 220, or decodes voice data received by the wireless communication unit 210 or the external input/output unit 213 and outputs the decoded voice data from the speaker 205. Furthermore, as illustrated in FIG. 8, for example, the speaker 205 may be mounted on the same surface as the surface provided with the display input unit 204 and the microphone 206 is mounted on a side surface of the housing 201.

The operating unit 207 is a hardware key which uses a key switch and receives an instruction from the user. For example, as illustrated in FIG. 8, the operating unit 207 is a push button type switch which is mounted on a side surface of the housing 201 of the smart phone 200 and turned on when the operating unit 207 is pressed by a finger and turned off by restoring force of a spring when the finger is removed.

The storing unit 212 stores a control program or control data of the main control unit 220, application software, address data to which names, phone numbers, or the like of communication counterparts are correlated, transmitted/received electronic mail data, web data downloaded by web browsing or downloaded content data, and temporarily stores streaming data. Further, the storing unit 212 is configured by an internal storing unit 217 which is equipped in the smart phone and an external storing unit 218 which includes a detachable external memory slot. Furthermore, the internal storing unit 217 and the external storing unit 218 which configure the storing unit 212 are implemented by using a storing medium such as a flash memory type, hard disk type, multimedia card micro type, or card type memory (for example, MicroSD (registered trademark) memory), a random access memory (RAM), or a read only memory (ROM).

The external input/output unit 213 functions as an interface with all external devices which are connected to the smart phone 200 and is configured to be directly or indirectly connected to any other external device by communication (for example, universal serial bus (USB) or IEEE1394) or a network (for example, Internet, wireless LAN, Bluetooth (registered trademark), a radio frequency identification (RFID), an infrared data association (IrDA (registered trademark)), ultra wideband (UWB: registered trademark), or a ZigBee (registered trademark).

As external devices connected to the smart phone 200, a wired/wireless head set, a wired/wireless external charger, a wired/wireless data port, a memory card or a SIM (subscriber identity module) card/UIM (user identity module) card connected through a card socket, an external audio/video device connected through an audio/video input/output (I/O) terminal, a wirelessly connected external audio/video device, a wired/wirelessly connected smart phone, a wired/wirelessly connected personal computer, a wired/wirelessly connected PDA, a wired/wirelessly connected personal computer, or an earphone may be exemplified. The external input/output unit 213 may transmit data which is received from such external devices to individual components in the smart phone 200 and may also allow the data in the smart phone 200 to be transmitted to an external device.

The GPS receiving unit 214 receives GPS signals which are transmitted from GPS satellites ST1 to STn according to an instruction from the main control unit 220 and performs a position measurement operation processing based on the received GPS signals to detect positions including a latitude, a longitude, and a height of the smart phone 200. When the GPS receiving unit 214 may obtain positional information from the wireless communication unit 210 or the external input/output unit 213 (for example, the wireless LAN), the GPS receiving unit 214 may detect a position using that positional information.

The motion sensor unit 215 includes, for example, a three axis acceleration sensor and detects physical movement of the smart phone 200 according to the instruction of the main control unit 220. When the physical movement of the smart phone 200 is detected, the movement direction or acceleration of the smart phone 200 is detected. The detected result is output to the main control unit 220.

The power supply 216 supplies power which is accumulated in a battery (not illustrated) to individual units of the smart phone 200 according to the instruction of the main control unit 220.

The main control unit 220 includes a microprocessor and operates according to a control program or control data stored in the storing unit 212 and collectively controls individual units of the smart phone 200. Further, the main control unit 220 is provided with a mobile communication control function to control individual units of a communication system and an application processing function in order to perform voice communication or data communication through the wireless communication unit 210.

The application processing function is implemented when the main control unit 220 is operated according to the application software which is stored in the storing unit 212. The application processing function includes, for example, an infrared communication function which performs data communication with a counterpart device by controlling the external input/output unit 213, an electronic mail function which transmits/receives an electronic mail, and a web browsing function which browses a web page.

The main control unit 220 is provided with an image processing function which displays an image on the display input unit 204 based on the image data (still image or moving picture data) such as received data or downloaded streaming data. The image processing function refers to a function of decoding the image data and performing image processings on the decoded result to display the image on the display input unit 204 by the main control unit 220.

The main control unit 220 executes a display control of the display panel 202 and an operation detection control which detects a user's operation through the operating unit 207 and the operating panel 203. By executing the display control, the main control unit 220 displays an icon to activate application software or a software key such as a scroll bar or displays a window for preparing an electronic mail. Here, the scroll bar refers to a software key for receiving an instruction to move a displayed portion of an image with respect to a large image which is not covered by the display region of the display panel 202.

By executing the operation detection control, the main control unit 220 detects the user's operation through the operating unit 207 or receives an operation on the icon or the input of a character string of an input section of the window through the operating panel 203 or receives a scroll request of a displayed image through the scroll bar.

By executing the operation detection control, the main control unit 220 is provided with a touch panel control function that controls a sensitive region of the operating panel 203 or a display position of the software key by determining whether the operating position of the operating panel 203 is an overlapping portion (display region) which overlaps the display panel 202 or an outer peripheral portion (non-display region) which does not overlap the display panel 202 other than the overlapping portion.

The main control unit 220 may detect a gesture operation with respect to the operating panel 203 and execute a predetermined function according to the detected gesture operation. The gesture operation refers to an operation which draws a trace using a finger, designates a plurality of positions simultaneously, or a combination thereof to draw a trace for at least one of the plurality of positions, rather than a simple touch operation of the related art.

The camera 208 includes constitutional elements other than the external memory control unit 20, the recording medium 21, the display control unit 22, the display unit 23, and the operating unit 14 in the digital camera which is illustrated in FIG. 1. Captured image data which is generated by the camera 208 may be stored in the storing unit 212 or output through the external input/output unit 213 or the wireless communication unit 210. Although the camera 208 is mounted on the same surface as the display input unit 204 in the smart phone 200 illustrated in FIG. 8, the mounting position of the camera 208 is not limited thereto and the camera 208 may be mounted on a rear surface of the display input unit 204.

The camera 208 may be used for various functions of the smart phone 200. For example, an image which is obtained by the camera 208 may be displayed on the display panel 202 or the image of the camera 208 may be used as one of operation inputs of the operating panel 203. Further, when the GPS receiving unit 214 detects the position, the position may be detected with reference to the image from the camera 208. Moreover, an optical axis direction of the camera 208 of the smart phone 200 may be determined or a current usage environment may also be determined with reference to the image from the camera 208 either without using the 3-axis acceleration sensor or using the 3-axis acceleration sensor. Of course, the image from the camera 208 can be used in the application software.

Positional information obtained by the GPS receiving unit 214, voice information obtained by the microphone 206 (which may be text information obtained by performing a voice-text conversion by the main control unit or the like), or posture information obtained by the motion sensor unit 215 may be added to the image data of a still image or a moving picture to be stored in the storing unit 212 or output through the external input/output unit 213 or the wireless communication unit 210.

Also in the smart phone 200 configured as described above, the main control unit 220 performs the processing illustrated in FIGS. 5 and 6 by using the solid-state imaging elements 5 and 5*a* as the imaging element of the camera 208, so that high speed and highly precise phase difference AF may be achieved.

As described above, the following matters are disclosed herein.

It is disclosed an imaging device, including: a sensor including a plurality of first phase difference detecting pixels which receives one of a pair of luminous fluxes which have passed through different parts of a pupil area of an imaging optical system and is arranged in a row direction and a plurality of second phase difference detecting pixels which receives the other one of the pair of luminous fluxes and is arranged in the row direction; a defocus amount calculating unit which calculates a correlated amount of a first output signal group and a second output signal group while shifting the first output signal group of the plurality of first phase difference detecting pixels and the second output signal group of the plurality of second phase difference detecting pixels in the row direction by an arbitrary amount to calculate a defocus amount from a first shift amount of the first output signal group and the second output signal group when the correlated amount is at a maximum; and a focus control unit which controls a focus state of the imaging optical system based on the defocus amount, in which the defocus amount calculating unit changes an upper limit of a shift amount of the first output signal group and the second output signal group in accordance with at least one of an F value of the imaging optical system, a focal distance of the imaging optical system, and a position of a focus lens included in the imaging optical system.

The imaging device may have a configuration, in which the sensor is an imaging element for imaging and phase difference detecting, including a plurality of imaging pixels which receives luminous fluxes passing through the pupil area of the imaging optical system and is two dimensionally arranged in the row direction and a column direction which is perpendicular to the row direction, the first phase difference detecting pixel and the second phase difference detecting pixel are disposed in different rows, and the imaging device includes: a driving unit which performs rolling shutter driving to change an exposure period for every row of pixels to read out a signal in accordance with a light receiving amount during the exposure from the pixels included in each row; and a shift amount calculating unit which calculates a second shift amount of the first output signal group and the second output signal group in the row direction caused by the rolling shutter driving, from a shift amount of the output signal groups when a correlated amount of the output signal groups of the plurality of imaging pixels included in two adjacent rows is at a maximum, and the defocus amount calculating unit changes the upper limit of the shift amount in accordance with at least one of the F value, the focal distance, and the position of the focus lens and the second shift amount.

The imaging device may have a configuration, in which the defocus amount calculating unit determines a value obtained by adding the second shift amount to the upper limit determined in accordance with at least one of the F value, the focal distance, and the position of the focus lens as the upper limit of the final shift amount.

The imaging device may have a configuration, in which the shift amount calculating unit selects a row including a phase difference detecting pixel which is an output source of the first output signal group and the imaging pixel and a row including a phase difference detecting pixel which is an output source of the second output signal group and the imaging pixel as the two adjacent rows.

It is disclosed a focus control method by an imaging device which includes a sensor including a plurality of first phase difference detecting pixels which receives one of a pair of luminous fluxes which have passed through different parts of a pupil area of an imaging optical system and is arranged in a row direction and a plurality of second phase difference detecting pixels which receives the other one of the pair of luminous fluxes and is arranged in the row direction, the method including: a defocus amount calculating step of calculating a correlated amount of a first output signal group and a second output signal group while shifting the first output signal group of the plurality of first phase difference detecting pixels and the second output signal group of the plurality of second phase difference detecting pixels in the row direction by an arbitrary shift amount to calculate a defocus amount from a shifted mount of the first output signal group and the second output signal group when the correlated amount is at a maximum; and a focus control step of controlling a focus state of the imaging optical system based on the defocus amount, in which in the defocus amount calculating step, an upper limit of a shift amount of the first output signal group and the second output signal group is changed in accordance with at least one of an F value of the imaging optical system, a focal distance of the imaging optical system, and a position of a focus lens included in the imaging optical system.

It is disclosed an imaging device, including: an imaging element which includes a plurality of pixels which is two dimensionally arranged in a row direction and a column direction which is perpendicular to the row direction, the plurality of pixels including a plurality of imaging pixels which receives luminous fluxes which have passed through a pupil area of an imaging optical system, a plurality of first phase difference detecting pixels which receives one of a pair of luminous fluxes which have passed through different parts of the pupil area of the imaging optical system, and a plurality of second phase difference detecting pixels which receives the other one of the pair of luminous fluxes; a driving unit which performs rolling shutter driving to change an exposure period for every row of the pixels to read out a signal in accordance with a light receiving amount during the exposure from the pixels included in each row; a defocus amount calculating unit which calculates a correlated amount of a first output signal group and a second output signal group while shifting the first output signal group of the plurality of first phase difference detecting pixels which is included in one of two adjacent rows among rows of the pixels and a second output signal group of the plurality of second phase difference detecting pixels which is included in the other one of the two rows in the row direction by an arbitrary amount to calculate a defocus amount from a first shift amount of the first output signal group and the second output signal group when the correlated amount is at a maximum; a focus control unit which controls a focus state of the imaging optical system based on the defocus amount; and a shift amount calculating unit which calculates a second shift amount of the first output signal group and the second output signal group in the row direction caused by the rolling shutter driving, from a shift amount of the output signal groups in the row direction when a correlated amount between the output signal groups of the plurality of imaging pixels included in two adjacent rows among the rows of the pixels is at the maximum, in which the defocus amount calculating unit changes an upper limit of the shift amount of the first output signal group and the second output signal group in accordance with the second shift amount.

The imaging device may have a configuration, in which the defocus amount calculating unit determines a value obtained by adding the second shift amount to a predetermined value as the upper limit of the shift amount.

The imaging device may have a configuration, in which the shift amount calculating unit selects a row including a phase difference detecting pixel which is an output source of the first output signal group and the imaging pixel and a row including a phase difference detecting pixel which is an output source of the second output signal group and the imaging pixel, as the two rows for calculating the correlated amount.

It is disclosed a focus control method by an imaging device which includes an imaging element which includes a plurality of pixels which is two dimensionally arranged in a row direction and a column direction which is perpendicular to the row direction, the plurality of pixels including a plurality of imaging pixels which receives luminous fluxes which have passed through a pupil area of an imaging optical system, a plurality of first phase difference detecting pixels which receives one of a pair of luminous fluxes which have passed through different parts of the pupil area of the imaging optical system, and a plurality of second phase difference detecting pixels which receives the other one of the pair of luminous fluxes, the method including: a driving step of performing rolling shutter driving to change an exposure period for every row of pixels to read out a signal in accordance with a light receiving amount during the exposure from the pixels included in each row; a defocus amount calculating step of calculating a correlated amount of a first output signal group and a second output signal group while shifting the first output signal group of the plurality of first phase difference detecting pixels which is included in one of two adjacent rows among rows of the pixels and a second output signal group of the plurality of second phase difference detecting pixels which is included in the other one of the two rows in the row direction by an arbitrary amount to calculate a defocus amount from a first shift amount of the first output signal group and the second output signal group when the correlated amount is at a maximum; a focus control step of controlling a focus state of the imaging optical system based on the defocus amount; and a shift amount calculating step of calculating a second shift amount of the first output signal group and the second output signal group in the row direction caused by the rolling shutter driving, from a shift amount of the output signal groups in the row direction when a correlated amount of the output signal groups of the plurality of imaging pixels included in two adjacent rows among the rows of pixels is at the maximum, in which in the defocus amount calculating step, an upper limit of the shift amount of the first output signal group and the second output signal group is changed in accordance with the second shift amount.

Any one of the disclosed matters provides an imaging device and a focus control method which may efficiently perform an operation of a phase difference amount to achieve high speed phase difference AF.

Although the present invention has been described above by the specific embodiments, the present invention is not limited to the embodiments but various modifications may be allowed without departing from a technical spirit of the disclosed invention.

What is claimed is:

1. An imaging device, comprising:
   a sensor including a plurality of first phase difference detecting pixels which receives one of a pair of luminous fluxes which have passed through different parts of a pupil area of an imaging optical system and is arranged in a row direction and a plurality of second phase difference detecting pixels which receives the other one of the pair of luminous fluxes and is arranged in the row direction;
   a defocus amount calculating unit which calculates a correlated amount of a first output signal group and a second output signal group while shifting the first output signal group of the plurality of first phase difference detecting pixels and the second output signal group of the plurality of second phase difference detecting pixels in the row direction by an arbitrary amount to calculate a defocus amount from a first shift amount of the first output signal group and the second output signal group when the correlated amount is at a maximum; and
   a focus control unit which controls a focus state of the imaging optical system based on the defocus amount,
   wherein the defocus amount calculating unit changes an upper limit of a shift amount of the first output signal group and the second output signal group in accordance with at least one of an F value of the imaging optical system, a focal distance of the imaging optical system, and a position of a focus lens included in the imaging optical system.

2. The imaging device of claim 1, wherein the sensor is an imaging element for imaging and phase difference detecting, including a plurality of imaging pixels which receives luminous fluxes passing through the pupil area of the imaging optical system and is two dimensionally arranged in the row direction and a column direction which is perpendicular to the row direction, the first phase difference detecting pixel and the second phase difference detecting pixel are disposed in different rows, and the imaging device includes:

a driving unit which performs rolling shutter driving to change an exposure period for every row of pixels to read out a signal in accordance with a light receiving amount during the exposure from the pixels included in each row; and a shift amount calculating unit which calculates a second shift amount of the first output signal group and the second output signal group in the row direction caused by the rolling shutter driving, from a shift amount of the output signal groups when a correlated amount of the output signal groups of the plurality of imaging pixels included in two adjacent rows is at a maximum, and the defocus amount calculating unit changes the upper limit of the shift amount in accordance with at least one of the F value, the focal distance, and the position of the focus lens and the second shift amount.

3. The imaging device of claim 2, wherein the defocus amount calculating unit determines a value obtained by adding the second shift amount to the upper limit determined in accordance with at least one of the F value, the focal distance, and the position of the focus lens as the upper limit of the final shift amount.

4. The imaging device of claim 2, wherein the shift amount calculating unit selects a row including a phase difference detecting pixel which is an output source of the first output signal group and the imaging pixel and a row including a phase difference detecting pixel which is an output source of the second output signal group and the imaging pixel as the two adjacent rows.

5. A focus control method by an imaging device which includes a sensor including a plurality of first phase difference detecting pixels which receives one of a pair of luminous fluxes which have passed through different parts of a pupil area of an imaging optical system and is arranged in a row direction and a plurality of second phase difference detecting pixels which receives the other one of the pair of luminous fluxes and is arranged in the row direction, the method comprising:

a defocus amount calculating step of calculating a correlated amount of a first output signal group and a second output signal group while shifting the first output signal group of the plurality of first phase difference detecting pixels and the second output signal group of the plurality of second phase difference detecting pixels in the row direction by an arbitrary shift amount to calculate a defocus amount from a shifted mount of the first output signal group and the second output signal group when the correlated amount is at a maximum; and a focus control step of controlling a focus state of the imaging optical system based on the defocus amount, wherein in the defocus amount calculating step, an upper limit of a shift amount of the first output signal group and the second output signal group is changed in accordance with at least one of an F value of the imaging optical system, a focal distance of the imaging optical system, and a position of a focus lens included in the imaging optical system.

6. An imaging device, comprising:

an imaging element which includes a plurality of pixels which is two dimensionally arranged in a row direction and a column direction which is perpendicular to the row direction, the plurality of pixels including a plurality of imaging pixels which receives luminous fluxes which have passed through a pupil area of an imaging optical system, a plurality of first phase difference detecting pixels which receives one of a pair of luminous fluxes which have passed through different parts of the pupil area of the imaging optical system, and a plurality of second phase difference detecting pixels which receives the other one of the pair of luminous fluxes;

a driving unit which performs rolling shutter driving to change an exposure period for every row of the pixels to read out a signal in accordance with a light receiving amount during the exposure from the pixels included in each row;

a defocus amount calculating unit which calculates a correlated amount of a first output signal group and a second output signal group while shifting the first output signal group of the plurality of first phase difference detecting pixels which is included in one of two adjacent rows among rows of the pixels and a second output signal group of the plurality of second phase difference detecting pixels which is included in the other one of the two rows in the row direction by an arbitrary amount to calculate a defocus amount from a first shift amount of the first output signal group and the second output signal group when the correlated amount is at a maximum;

a focus control unit which controls a focus state of the imaging optical system based on the defocus amount; and a shift amount calculating unit which calculates a second shift amount of the first output signal group and the second output signal group in the row direction caused by the rolling shutter driving, from a shift amount of the output signal groups in the row direction when a correlated amount between the output signal groups of the plurality of imaging pixels included in two adjacent rows among the rows of the pixels is at the maximum, wherein the defocus amount calculating unit changes an upper limit of the shift amount of the first output signal group and the second output signal group in accordance with the second shift amount.

7. The imaging device of claim 6, wherein the defocus amount calculating unit determines a value obtained by adding the second shift amount to a predetermined value as the upper limit of the shift amount.

8. The imaging device of claim 6, wherein the shift amount calculating unit selects a row including a phase difference detecting pixel which is an output source of the first output signal group and the imaging pixel and a row including a phase difference detecting pixel which is an output source of the second output signal group and the imaging pixel, as the two rows for calculating the correlated amount.

9. A focus control method by an imaging device which includes an imaging element which includes a plurality of pixels which is two dimensionally arranged in a row direction and a column direction which is perpendicular to the row direction, the plurality of pixels including a plurality of imaging pixels which receives luminous fluxes which have passed through a pupil area of an imaging optical system, a plurality of first phase difference detecting pixels which receives one of a pair of luminous fluxes which have passed through different parts of the pupil area of the imaging optical system, and a plurality of second phase difference detecting pixels which receives the other one of the pair of luminous fluxes, the method comprising:
- a driving step of performing rolling shutter driving to change an exposure period for every row of pixels to read out a signal in accordance with a light receiving amount during the exposure from the pixels included in each row;
- a defocus amount calculating step of calculating a correlated amount of a first output signal group and a second output signal group while shifting the first output signal group of the plurality of first phase difference detecting pixels which is included in one of two adjacent rows among rows of the pixels and a second output signal group of the plurality of second phase difference detecting pixels which is included in the other one of the two rows in the row direction by an arbitrary amount to calculate a defocus amount from a first shift amount of the first output signal group and the second output signal group when the correlated amount is at a maximum;
- a focus control step of controlling a focus state of the imaging optical system based on the defocus amount; and
- a shift amount calculating step of calculating a second shift amount of the first output signal group and the second output signal group in the row direction caused by the rolling shutter driving, from a shift amount of the output signal groups in the row direction when a correlated amount of the output signal groups of the plurality of imaging pixels included in two adjacent rows among the rows of pixels is at the maximum,
wherein in the defocus amount calculating step, an upper limit of the shift amount of the first output signal group and the second output signal group is changed in accordance with the second shift amount.

* * * * *